United States Patent [19]

Marotta

[11] 4,402,257

[45] Sep. 6, 1983

[54] ELECTRIC COFFEE MAKER

[76] Inventor: Vincent G. Marotta, 18801 So. Park Blvd., Shaker Heights, Ohio 44122

[21] Appl. No.: 425,496

[22] Filed: Sep. 28, 1982

Related U.S. Application Data

[63] Continuation of Ser. No. 279,666, Jul. 1, 1981, abandoned.

[51] Int. Cl.³ .............................................. A47J 31/00
[52] U.S. Cl. ......................................... 99/307; 99/295
[58] Field of Search ................. 99/304, 305, 307, 308, 99/300, 313, 295, 281, 282, 283

[56] References Cited

U.S. PATENT DOCUMENTS

| | | | |
|---|---|---|---|
| 3,348,468 | 10/1967 | Eisendrath | 99/305 |
| 3,589,271 | 6/1971 | Tarrant | 99/305 |
| 3,693,535 | 9/1972 | Abel | 99/305 |
| 3,987,717 | 10/1976 | Bergmann | 99/294 |
| 3,996,846 | 12/1976 | Hupf | 99/307 |
| 4,094,233 | 6/1978 | Martin | 99/305 |
| 4,222,320 | 9/1980 | Castleberry | 99/295 |

*Primary Examiner*—Robert W. Jenkins
*Attorney, Agent, or Firm*—Yount & Tarolli

[57] ABSTRACT

An automatic electric coffee maker has a housing including a base and a hood mounted atop the base. The base includes a horizontal support for supporting a coffee decanter so as to be located immediately underneath an overhanging portion of the hood from which a coffee basket is supported. The base has a body which extends from one side of the decanter support and extends upwardly toward and is attached to the hood. The hood has walls defining a water chamber for containing water to be heated. An electric water pump heater is mounted within the body adjacent its upper end and has a pump tube extending from a pump well thereof upwardly through an aperture in the top wall of the body through the water chamber to a discharge spout which extends through the overhanging hood portion and terminates in a discharge outlet which extends downwardly through the hood so as to discharge heated water into a coffee basket located therebelow. Essentially all of the water to be heated is located above the level of the coffee basket, permitting a short pump tube thereby minimizing the volume of cold water initially maintained therein. This structure increases the brewing efficiency in that it increases the discharge water temperature and decreases the brewing time.

22 Claims, 7 Drawing Figures

ELECTRIC COFFEE MAKER

This is a continuation of application Ser. No. 279,666 filed July 1, 1981, now abandoned.

BACKGROUND OF THE INVENTION

This invention relates to the art of coffee makers of the type having a water reservoir within a coffee maker housing and having means within the housing for heating the water obtained from the reservoir and pumping the hot water so as to be discharged into a coffee basket mounted above a coffee decanter.

Some of the prior art coffee makers of this type include those shown in the U.S. Patents to C. J. Hupf, U.S. Pat. No. 3,996,846 and K. H. Bergmann, U.S. Pat. No. 3,987,717. Such coffee makers typically provide a housing including a base and a hood, mounted atop the base, with the base having a coffee decanter support portion extending horizontally therefrom to support a coffee decanter. A body portion extends upwardly from the support portion and terminates in an overhanging hood. The hood provides a means for communicating heated water from a heater, mounted in the base, to be discharged into a coffee basket located below the hood and above a decanter. In such coffee makers, the overhanging hood portion serves mainly as a conduit for the heated water to be discharged into the coffee basket and the upstanding base portion contains a water reservoir so as to provide a vertical column of water to be heated. The water heater is located underneath the reservoir and is typically mounted to the floor of the base portion. The heater is known as a water pump heater and has a riser tube or pump tube which serves as a conduit for discharging heated water from the heat pump upwardly through the water reservoir and then discharged through the overhanging hood portion and into the coffee basket therebelow. In some versions of this type of coffee brewing machine, the coffee basket is slidably secured to the overhanging hood and discharges brewed coffee into a coffee decanter located therebelow on the decanter support. In other types, the coffee basket rests directly on top of the coffee decanter.

Water heated by the pump heater is pumped upwardly through the pump tube a vertical distance corresponding with that from the pump to the overhanging discharge spout. Water to be heated is poured into the coffee maker through a opening on top of the hood so as to fill the water reservoir. In so doing, cold water fills the pump and the riser tube to a height corresponding with the water level in the reservoir. Consequently, when the electric pump heater is turned on and commences its pumping operation, this initial volume or slug of cold water in the pump tube is pushed upwardly through the pump tube to the discharge spout and discharged into the coffee basket. This detracts from the brewing operation since it is desirable that the temperature of the water being discharged into the coffee basket be in the range of about 195° F. to 205° F. A notable problem in the prior art coffee makers of the types referred to above is the height of the pump tube. With the pump being mounted on the bottom of the base the pump tube may well have a height on the order of seven to eight inches measured upwardly from the pump well to the discharge spout. It has been determined that the temperature of the water discharged from the spout into the coffee basket is directly related to the head or height of water in the pump tube. The shorter the pump tube, the higher will be the temperature of the discharged water.

SUMMARY OF THE INVENTION

It is a principle object of the present invention to provide a coffee maker of the type described but employing a riser or pump tube of shorter length so as to thereby increase the temperature of the water being discharged into the coffee basket.

It is still a further object of the present invention to provide such a coffee maker having a preheat chamber extending for a portion of the length of the pump tube above the pump well for further increasing the water discharge temperature.

It is still a further object of the present invention to provide a coffee maker of the type described including means for diverting heated water in a horizontal direction as it exits from the pump tube into the overhanging discharge spout so as to minimize the tendency of water to be splashed back into the pump tube.

It is still a further object of the present invention to provide a coffee maker of the type described having a discharge spout wherein the discharge outlet is increased in cross-sectional area so as to cause the discharging water to swirl outwardly to attain a more uniform distribution of heated water into the coffee basket.

The foregoing and other objects of the invention are attained in accordance with the present invention with a coffee brewer having a housing which includes a base and a hood mounted atop the base. The base has a coffee decanter support portion which extends horizontally outwardly therefrom so as to provide support for a coffee decanter. A body portion extends upwardly from one side of the support portion and serves to carry, atop thereof, the hood which has a portion which extends upwardly and horizontally outwardly from the body portion so as to overhang the decanter support portion. This is at a height sufficient to permit a coffee decanter and a coffee basket to be located between decanter support and the overhanging hood. The hood has walls which define a water chamber therein so as to contain water to be heated in such a manner that essentially all of the water is located above the coffee basket. An electric water pump heater is mounted inside the body portion immediately below the water chamber with the pump heater having a pump well extending upwardly toward the water chamber. A pump tube extends from the pump well upwardly through the water chamber and terminates in fluid communication with a water discharge spout. The water discharge spout extends horizontally through the water chamber and terminates in a discharge portion which extends vertically downward through the hood and is positioned to discharge heated water into a coffee basket located therebelow. With this construction, the length or height of the pump tube is short and is only sufficient to convey water from the pump well into the discharge spout. This minimizes the volume of water stored within the pump tube and increases the temperature of heated water discharged into the coffee basket.

In accordance with a further aspect of the present invention the discharge spout is provided with means for diverting water pumped vertically upward from the pump well in a horizontal direction to the spout discharge outlet so as to minimize splashback of water downwardly into the pump tube.

In accordance with the still further aspect of the invention a preheating chamber is provided which extends upwardly from the pump well about the pump tube so as to preheat a portion of the water within the pump tube to thereby increase the water discharge temperature.

Still further in accordance with the invention the outlet discharge spout is increased in cross-sectional area so as to enable discharging water to swirl outwardly into a coffee basket so as to attain a more uniform distribution of heated water into the basket.

The foregoing and other objects of the invention will become more clearly apparent from the following description of the preferred embodiment of the invention as taken in conjunction with the accompanying drawings, which are a part hereof, and wherein.

DESCRIPTION OF THE PREFERRED EMBODIMENT

Figure 1:
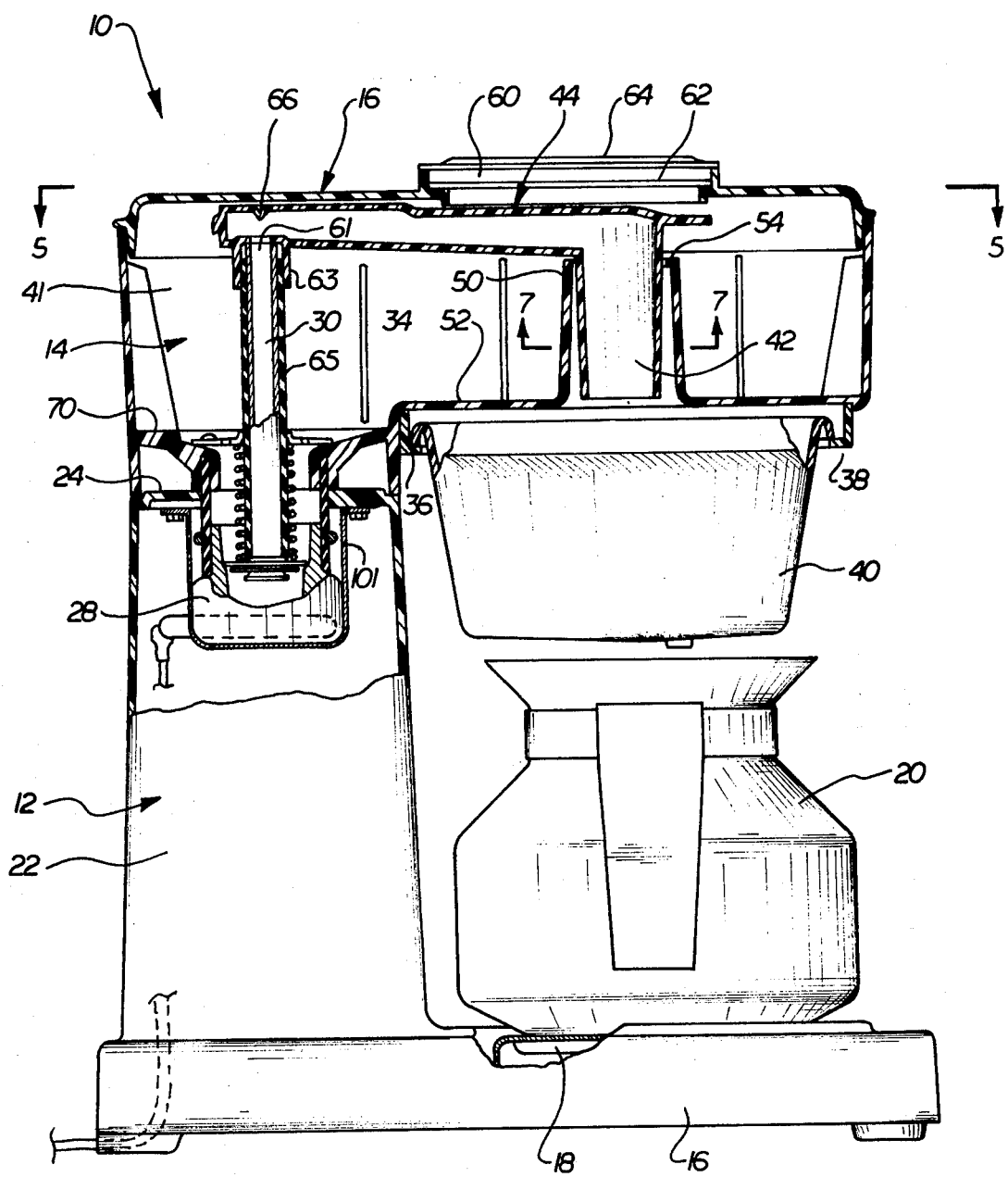
FIG. 1 is an elevation view of the coffee maker with parts broken away showing a cross-sectional view of the water chamber and the electric water pump heater mounted immediately therebelow, together with the pump tube and the discharge spout.

Reference is now made to the drawings wherein the showings are for purposes illustrating a preferred embodiment of the invention only and not purposes of limiting same. In FIG. 1 there is illustrated a coffee brewing machine constructed in accordance with the present invention. The machine includes a housing 10 which is comprised of a base 12, a hood 14, and a hood cover 16. Each is formed of molded plastic material. Base 12, as best seen in FIG. 1, is somewhat L-shaped in that it includes a horizontally extending coffee decanter support portion 16 which contains an electrically powered warmer plate 18 for supporting a coffee decanter 20 as well as for maintaining brewed coffee therein warmed at a temperature on the order of 187° F. A body portion 22 extends from one side of support 16 vertically upward toward and serves to support hood 14. The body portion 22 is a hollow structure and it has upstanding side walls which terminate in a top wall 24. Wall 24 is provided with an aperture 26. The body portion 22 serves to house an electric water pump heater 28 having a pump tube 30 extending upwardly therefrom through the aperture 26 into the hood 14.

Hood 14 has vertically extending side walls corresponding with the upwardly extending side walls of base 12 and rests atop the base and is secured thereto, as by screws, not shown. One side of the hood extends horizontally outward at 34 from base 12 so as to overhang the decanter support 16. The underside of hood 14 is provided with suitable means, such as rails 36 and 38, for slidably receiving a coffee funnel or basket 40 in which coffee grounds are preferably placed within a paper filter. The basket 40, in a conventional manner, is open at the top for receiving a paper filter with coffee grounds therein so that when it is positioned on rails 36 and 38 it may receive heated water from the outlet 42 of a discharge spout 44, to be described in greater detail hereinafter. As is conventional, the basket 40 is provided with a small aperture at a lower surface from which brewed coffee may drip into a decanter 20 located immediately beneath the coffee basket, as is shown in FIG. 1.

Hood 14 has walls defining a water chamber 41 for containing water to be heated. The lower wall 52 of the hood is provided with an upstanding tubular opening 50 of sufficient diameter to receive therein the spout discharge outlet 42, also of circular cross section. The water chamber 41 defined by the inner walls of hood 14 may contain a volume of water up to a height corresponding with the upper end 54 of opening 50. This is sufficient to contain enough water to provide eight to twelve cups of coffee (eight cups being on the order of 50 oz.).

The hood cover 16 is provided with an opening 60 through which water may be poured into the water chamber 41. The opening 60 is provided with a screen 62 together with a manually operable lid 64 which preferably pivots from one end of the opening. The lid serves as a protective dust cover as well as for keeping water vapor inside the coffee maker. Cover 16 may also be constructed from molded plastic and is structured so as to have a snap fit with hood 14 to enable its easy removal for cleaning purposes.

Figure 2:
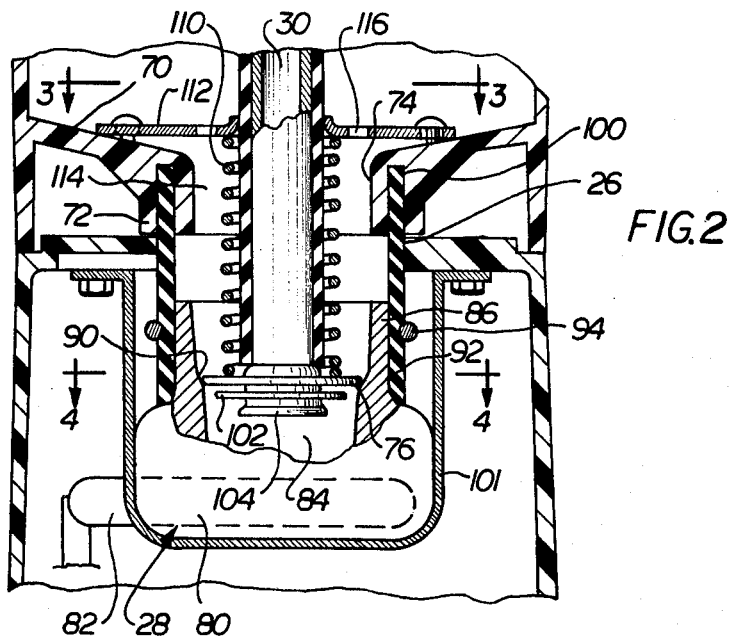
FIG. 2 is an enlarged sectional view of a portion of FIG. 1 but showing in greater detail the electric water pump heater.

The discharge spout 44 has a circular inlet 61 in fluid communication with the upper end of pump tube 30 to receive heated water therefrom. The spout is provided with a downwardly extending circular sleeve 63 extending coaxially about inlet 61 for receiving the upper end of pump tube 30. As best shown in FIG. 2 the pump tube 30 is a metal, such as aluminum, and is surrounded by a rubber jacket 65 which extends upwardly so as to be resiliently received within sleeve 63 extending from spout 44 to effect a water tight connection. The rubber jacket 65 also serves as a thermal insulator to keep the water within tube 30 from being cooled by the water in chamber 41. The roof of spout 44 is provided with a downwardly extending, conically shaped, water divertor 66 located immediately above inlet 61. Divertor 66 horizontally diverts water being pumped into the spout from the pump tube 30. This minimizes the tendency for the water to splash back downwardly into the pump tube 30.

The spout extends transversely through the hood from pump tube 30 in a slightly downward direction so that water received at inlet 61 will be directed to the discharge outlet 42 and, thence, into basket 40. It is to be noted that the cross-sectional area of the discharge spout 44 is increased as it bends downwardly to form the discharge outlet 42. This increased area permits water being pumped to the spout to have a tendency to swirl downwardly along the circular walls of the discharge outlet 42 as it exits from the outlet and enters the coffee basket 40. If the cross-sectional area had not been increased there would be a tendency for the discharged water to form a jet and shoot directly downwardly to impinge into the coffee grounds therebelow in the coffee basket. This would create a cavity effect in the coffee grounds and this might tend to tear a hole through the paper filter. This would have a deteriorating effect on the quality of the coffee being brewed. It has been found that the swirling effect, as the water exits downwardly along the walls of discharge outlet 42, avoids this cavity effect. The water sprays outwardly from the discharge outlet as it enters the coffee basket 40.

Figure 3:
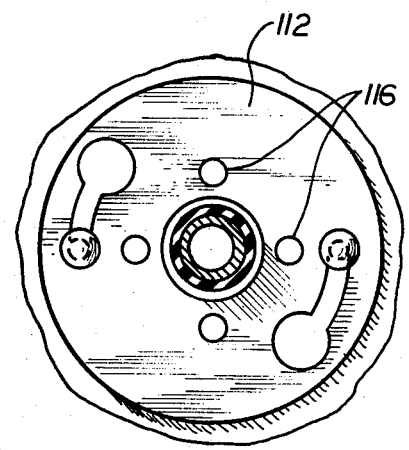
FIG. 3 is a sectional view taken generally along the line 3—3 looking in the direction of the arrows of FIG. 2.
Figure 4:
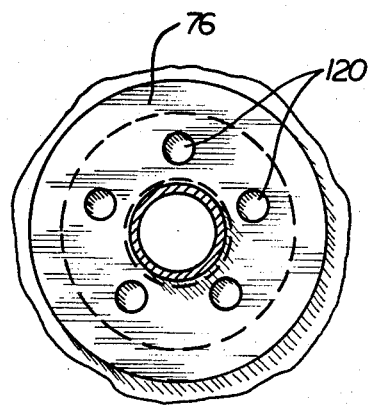
FIG. 4 is an enlarged sectional view looking generally along the line 4—4 looking in the direction of the arrows of FIG. 2.
Figure 5:
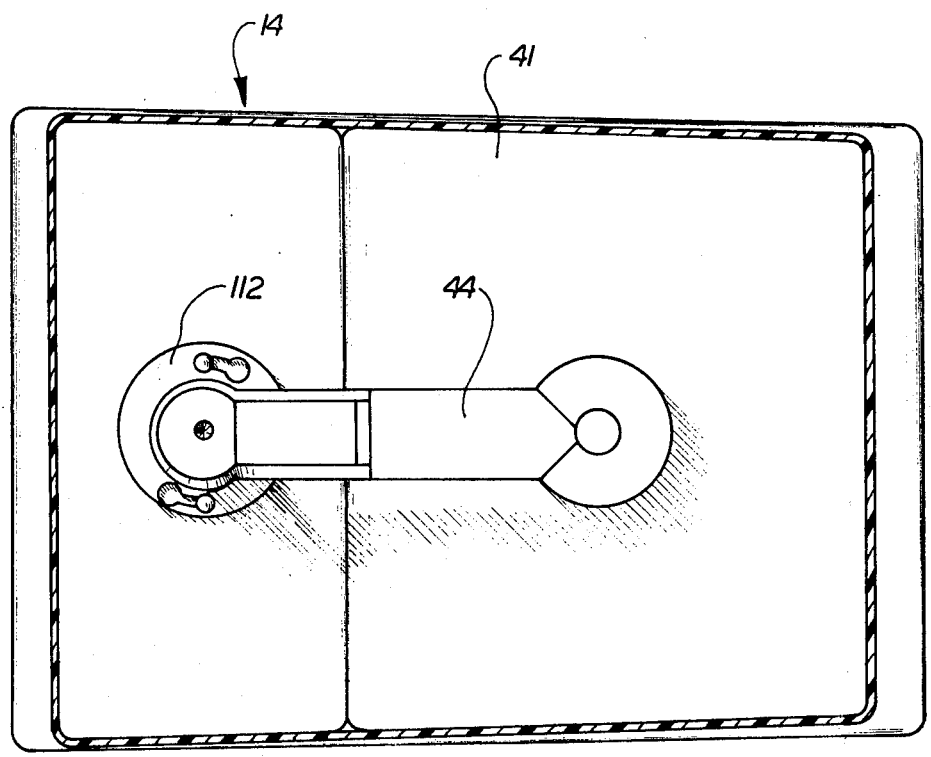
FIG. 5 is a sectional view taken along line 5—5 looking in the direction of the arrows of FIG. 1.
Figure 6:
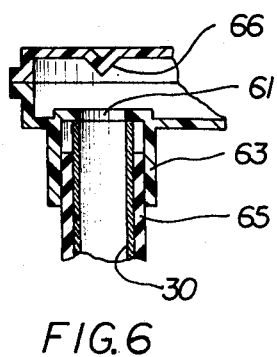
FIG. 6 is an enlarged sectional view taken along line 6—6 looking in the direction of the arrows of FIG. 1.
Figure 7:
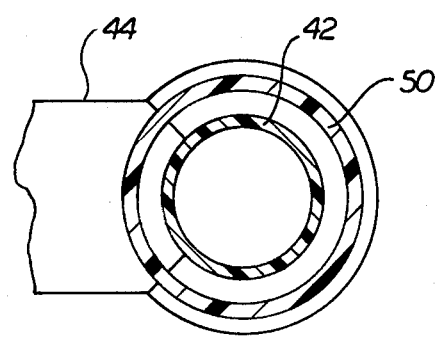
FIG. 7 is an enlarged sectional view taken along line 7—7 looking in the direction of the arrows of FIG. 1.

Hood 14 is molded so as to provide, at its lower end, a water chamber floor 70 which extends inwardly from the side walls which overlie and are in registry with those of base 22. As best shown in FIG. 2, floor 70 extends inwardly toward the pump tube 30 and terminates in the downwardly extending circular sleeve 72. The inner surface 74 is of sufficient diameter to permit removal therethrough of the pump tube 30 along with its pump plate 76, secured thereto at its lower end (as is best shown in FIGS. 2, 3 and 4). This removability is desirable for ease in cleaning the coffee maker.

The electric water pump heater includes a metal casting 80 having an electric heating element 82 located therein. The casting is formed so as to have a well 84 for receiving water to be heated by element 82. The casting extends upwardly from the well 84 and terminates in a circular opening 86. The inner surface of the casting as it extends upwardly from the well is flared outwardly and is provided with a circular valve seat 90 against which the lower portion of pump plate 76 rests during operation. A rubber jacket surrounds the exterior surface of casting 80 at its upper opening 86 and is held in place, to effect a water tight seal, by means of a metal clamp 94. The rubber jacket 92 extends upwardly through aperture 26 and is resiliently received in a press fit engagement within an annular groove 100 in the sleeve 72 extending from the bottom wall 70 of the water chamber. This resilient fit effects a water tight seal. A somewhat U-shaped metal retainer clamp 101 supports the weight of the electric water pump heater and is secured at its upper ends to the upper wall 24 of base 22, as by means of suitable screws.

Pump plate 76 is secured proximate to the lower end of pump tube 30 and extends radially outward therefrom so as to engage valve seat 90 in the pump well 84. Pump tube 30 also carries a valve plate 102 which is located between an outwardly flared end 104 of tube 30 and pump plate 76. Plate 102 is loosely mounted on the end of tube 30 with its travel being limited by the flared end 104 and plate 76.

In assembly, the pump plate 76 is held downwardly against valve seat 90 by resilient forces exerted by a compression spring 110 which coaxially and loosely surrounds tube 30 and its jacket 65. The lower end of the spring bears against the upper surface of the plate 76 and the spring is placed into compression by means of a hold-down baffle plate 112 which presses against the upper end of the spring. Baffle plate 112 is loosely carried by pump tube 30 and its jacket 65 and extends radially outwardly therefrom. Plate 112, as best shown in FIG. 3, is a circular disc and in assembly is held down against spring 110 as by a slot and rivot locking arrangement, as best shown in FIG. 3. Additionally, plate 112 serves to define the roof of a preheating chamber 114 extending coaxially about tube 30 between pump plate 76 and hold-down plate 112. Plate 112 is provided with a plurality of apertures 116 so that water may be supplied from the water chamber 41 into the preheating chamber. Water located in the preheating chamber 114 is supplied into the well 84 by means of apertures 120 in the pump plate 90 (see FIG. 4).

In operation, water is initially introduced into the water chamber 41 by way of opening 60. This may be done by first filling a decanter, such as decanter 20, with sufficient water to brew the desired number of cups of coffee. The water is then poured into opening 60. The water in chamber 41 seeps down through orifices 116 in plate 112 into the preheating chamber 114 and then seeps downwardly through orifices 120 in pump plate 76 to fill the well 84. Additionally, water will fill the interior of the pump tube 30 to the height of the water level in the water chamber 41. When power is turned on, electric heater element 82 will commence heating the water to its boiling temperature. As steam forms in the well, valve plate 102 is moved upwardly against plate 76 to block the orifices 120 therein, causing water to be pushed upwardly through tube 30 to the discharge spout and, thence, discharged from the outlet 42 thereof into the coffee basket 40. After the initial spurt of water has been forced upwardly through tube 30, the vapor pressure within the well 84 decreases sufficient that the valve plate 102 drops or opens to permit water from the preheating chamber 114 to fill well 84. The water in the well then heats to boiling temperature again and forces another spurt of hot water upwardly through tube 30. This perculating action continues to cycle until the water in chamber 41 has been exhausted.

By structuring the coffee maker so as to have a pump tube 30 of relatively short length provides efficiencies in the operation of the coffee maker. A reasonable brewing time may be on the order of seven to eight minutes to fill a decanter with eight to ten cups of coffee. However, in addition to a reasonable brewing time, the brewed coffee should be delivered into the decanter at a temperature on the order of 190° F. so that with a suitable warmer plate 18 the coffee may be kept warm at a temperature on the order of 187° F. This, then, requires that the water discharged from the discharge portion 42 of spout 44 be on the order of 195° F. to 205° F. (approximately 10° F. drop takes place as the water seeps downwardly through the grounds in basket 40).

In order to achieve such a high water discharge temperature the pump tube 30 is of a length only sufficient to discharge water upwardly from the pump well into the spout 44. By locating the water chamber 41 above the level of the coffee basket the structure permits locating the electric water pump heater 28 immediately below the water chamber permitting the pump tube 30 to have a relatively short length. This contrasts with the typical coffee maker of this type wherein the water pump heater is mounted at the bottom or floor of the base. In such a device, the water reservoir fills the base, requiring that the pump tube extend upwardly through the base to a height sufficient to make communication with a discharge spout which extends over the coffee basket.

The length of the pump tube is significant. During the initial operation as water is being heated in well 84, the heated water will tend to rise and be displaced with cold water. The greater the volume of cold water in the pump tube the greater will be the time delay from heater turn-on until boiling temperature is reached. Thus the time required for the initial spurt of water to be pumped is increased with the length of the pump tube and, additionally, the average temperature of the water being discharged will vary inversely with the length of the pump tube. Consequently, by structuring the pump as shown in FIGS. 1 and 2 efficiencies are accomplished in both reduction in time to commence pumping action, once the heater element 80 has been energized, and the temperature of the discharged water is increased. This permits shorter brewing time and discharge temperatures which may approach the level of 195° F. to 205° F.

Additional efficiency is accomplished with the structure disclosed herein by means of the prewarmer chamber 114. But for the baffle hold-down plate 112, which defines the upper level of the prewarming chamber, water being heated in the well would cause a bubbling effect and these bubbles would rise upwardly into the water chamber 41 where the heat is dissipated throughout a large volume of water into the walls of hood 14. The presence of the hold-down baffle 112 seated against the floor of the water chamber tends to cause the heat to be retained in a more efficient manner within the prewarmer chamber 114. This tends to prewarm the water that is to be later heated in the well 84 as well as to maintain the water inside pump tube 30 at a higher temperature. This, then, will shorten the cycle time for the water in well 84 to be heated to cause pumping action. Consequently, the brewing time to heat the volume of water from chamber 41 and pass it into the decanter 20 may be decreased. At the same time, since the water is prewarmed and since the water in tube 30 is maintained warmer because of this prewarmer chamber, the average temperature of the water being discharged will be increased.

The invention has been described with respect to a preferred embodiment. It is to be understood that various arrangements and variations may be made without departing the spirit and scope of the invention as defined by the appended claims.

I claim:

1. A coffee brewer having a housing including a base and a hood mounted atop said base, said base being somewhat L-shaped and having a coffee decanter support portion extending horizontally therefrom to support a coffee decanter thereon and a body portion extending upwardly from said support portion, said hood being mounted atop said body portion and having an overhanging portion extending horizontally outward from said body portion so as to overhang said decanter support portion, the underside of said overhanging portion of said hood being vertically spaced above said decanter support to allow room for a decanter and a coffee basket, said hood having walls defining a water chamber therein for containing water to be heated so that essentially all of the water to be heated is located above the underside of said hood, an electric water pump heater mounted inside said body portion immediately below said hood and having a pump well extending upwardly therefrom, a pump tube extending from said pump well upwardly into said water chamber, a water discharge spout located in said hood in fluid communication with the upper end of said pump tube and extending outwardly from said tube and terminating in a discharge portion thereof which extends essentially vertically downwardly through the underside of said hood to discharge heated water into a said coffee basket located therebelow, whereby said pump tube is of a shortened length thereby minimizing the volume of water maintained in said tube whereby the temperature of water discharged into said coffee basket is increased.

2. A coffee brewer as set forth in claim 1, wherein said discharge spout has an inlet for receiving water from the upper end of said pump tube and divertor means located within and facing said inlet for diverting received water in a direction transversely of said tube to thereby minimize the tendency of the received water to splash back downwardly into said tube.

3. A coffee brewer as set forth in claim 2, wherein said divertor means is formed with conical shape with its apex in registry with and pointing downwardly toward said inlet.

4. A coffee brewer as set forth in claim 3, wherein said discharge spout is a hollow tubular member and said divertor means is integral with and formed in the inner walls thereof.

5. A coffee brewer as set forth in claim 1, wherein said spout extends transversely from said pump tube within said hood and terminates in a downwardly extending discharge outlet extending through the underside of said hood at a position located so as to discharge heated water into a coffee basket located therebelow.

6. A coffee brewer as set forth in claim 5, wherein said spout is an elongated L-shaped hollow structure having an inlet at one end for receiving water from said pump tube and which extends transversely away from said tube in said hood and then extends downwardly forming said discharge outlet.

7. A coffee brewer as set forth in claim 6, wherein said discharge outlet of said spout is of greater cross-sectional area than said transversely extending portion so as to permit water discharging therefrom to spray outwardly as it enters a coffee basket therebelow.

8. A coffee brewer as set forth in claim 7, wherein said discharge outlet is circular in cross section whereby the discharging water will tend to swirl downwardly along the circular inner surface thereof so as to spray outwardly as it exits from said discharge outlet.

9. A coffee brewer as set forth in claim 8, wherein said spout has inner walls defining a conically shaped divertor located above and pointed downwardly toward said inlet for transversely diverting water received from said pump tube.

10. A coffee brewer as set forth in claim 6, wherein said spout has means extending from said inlet for receiving a portion of the length of the upper end of said pump tube, and means for effecting a water tight engagement therewith.

11. A coffee brewer as set forth in claim 10, wherein said means for effecting a water tight engagement includes a resilient jacket surrounding at least said length of said pump tube.

12. A coffee brewer as set forth in claim 1 wherein said hood has a bottom wall which overlies said upwardly extending body portion and extends inwardly toward said pump tube terminating in a downwardly extending sleeve so as to define a circular opening through which said pump tube extends upwardly from the pump well into said water chamber.

13. A coffee brewer as set forth in claim 12 wherein said pump tube carries valving means at its lower end for cooperating with said pump well to define a heating chamber therebelow and wherein the inner diameter of said bottom wall opening is sufficient to permit said pump tube with said valving means to be inserted and removed therethrough.

14. A coffee brewer as set forth in claim 13 including baffle plate means carried by said pump tube and extending outwardly therefrom and secured to the bottom wall of said hood above the opening therein so as to essentially close the opening thereby defining a prewarmer chamber between said valving means and said baffle means.

15. A coffee brewer as set forth in claim 14 wherein said baffle means has apertures formed therein to permit water in said water chamber to seep downwardly into said preheating chamber to be warmed therein prior to being heated in said heating chamber.

16. A coffee brewer as set forth in claim 15 wherein said valving means has means for permitting water to flow from said warming chamber into said heating chamber to be heated therein.

17. A coffee brewer as set forth in claim 16 including jacket means surrounding said pump tube throughout its length and being constructed of insulating material so as to thermally insulate the water within said tube from that within said water chamber to minimize loss of heat.

18. A coffee brewer having an upper portion defining a laterally extending water chamber for receiving water to be heated and a support portion extending downwardly from the upper portion, said water chamber being over and having a lateral portion extending outwardly and laterally of said support portion, the walls of said water chamber being configured such that substantially all of the water in the chamber is located above the underside of said lateral portion, a water pump comprising a pump well communicating with said chamber to receive water therefrom and an electric heater, said well extending downwardly from the underside of said water chamber within said support portion, means for delivering heated vapor from said pump well to a vertical discharge spout for discharging water through the underside of said lateral portion to a coffee holder therebeneath comprising a pump tube extending upwardly from said pump well toward the top of said water chamber and then communicating with said spout along a generally lateral path adjacent to the top of said chamber.

19. A coffee brewer as set forth in claim 18 wherein the underside of said water chamber has a re-entrant portion through which said spout passes.

20. A coffee brewer as set forth in claim 19 wherein the walls of said re-entrant portion closely surrounds said spout at the top of said re-entrant portion and diverge downwardly and outwardly from said spout.

21. A coffee brewer as set forth in claim 18, including diverter means above the top of the vertical portion of said tube for diverting water in a direction transversely of said tube to minimize the tendency of the received water to splash back downwardly into the vertical portion of said tube.

22. A coffee brewer as set forth in claim 21, wherein said diverter means has a conical shape substantially coaxial with the vertical portion of said tube with the apex pointing downward.

* * * * *